Patented Mar. 11, 1924.

1,486,792

UNITED STATES PATENT OFFICE.

HINRICH OHLHAVER, OF SANDE, NEAR BERGEDORF, GERMANY.

PROCESS OF MAKING A COFFEE SUBSTITUTE.

No Drawing.   Application filed March 16, 1923.   Serial No. 625,617.

*To all whom it may concern:*

Be it known that I, HINRICH OHLHAVER, merchant, a subject of the German Republic, residing at Sande, near Bergedorf, Germany, Billwarderstrasse 21, have invented a new and useful Process of Making a Coffee Substitute, of which the following is a specification.

This invention relates to a process of producing a coffee substitute. The opinion has hitherto been prevailing that albuminous substances were the cause of the undesirable palate and odor attached to coffee surrogates, produced from grain or cereals or other starch containing bodies. This opinion I agree is correct. This theory, however, is completely reversed as soon as the alubuminous substances are impregnated with a thin solution of phosphates and then coagulated. The albuminous substances thus altered show entirely different qualities, enter into combinations with the starch, which being simultaneously changed into paste, and influence most favorably the taste and odor of the coffee substitute that is made from them.

The albuminous substances in grain or other starch containing products are not exclusively accumulated in certain distinct places, but that part of the product containing starch is thoroughly and finely permeated with albuminous substances, and to bring about a change just in this part in a suitable manner is of especial importance.

For this purpose, according to the present process, the grain, or the like, is first soaked in a solution of about 1 or 2% of phosphates. As phosphates serve the combinations soluble in water of the phosphoric acid with calcium, magnesium, potassium, sodium and ammonium. The substance thus soaked is raised to a temperature at which the changed albumen coagulates, and the starch becomes paste. The requisite temperature differs according to the albuminous substances and according to the kind of starch, and varies between 60 to 90 degrees cent. In order to be sure that the albuminous substances being coagulated and all the starch having been changed into paste, the temperature may be raised to boiling heat. Even a higher temperature can be applied without harm, whilst through the application of a vacuum the same purpose may be attained by a considerably lower temperature.

The product after having been treated in this manner is now dried and roasted in the usual way. The product obtained according to this process may only be dried, and as a preserved article can be stored or shipped anywhere and then be roasted at a later period.

The aforementioned description refers not only to the utilization of grain, but also to cereals, sliced potatoes or other kinds of seeds or products containing albumen and starch which may be utilized just as well.

What I claim as my invention and desire to secure by Letters Patent is:

1. A process for the production of a coffee substitute from albumino-starch compounds, consisting in impregnating the compound with a solution of phosphates and heating to temperatures at which the albuminous substances coagulate and the starch is changed into paste, previous to roasting.

2. A process for the production of a coffee substitute from albumino-starch compounds, consisting in impregnating the compound with a substantially two per cent solution of phosphates and heating to temperatures at which the albuminous substances coagulate and the starch is changed into paste, previous to roasting.

The foregoing specification signed at Hamburg, Germany, this 6th day of February, 1923.

HINRICH OHLHAVER.

In presence of two witnesses—
 ERNST OHLHAVER,
 ANNA MEYER.